United States Patent
Kim et al.

(10) Patent No.: US 7,864,641 B2
(45) Date of Patent: Jan. 4, 2011

(54) OPTICAL DISK HAVING DIVIDED WRITE STRATEGY TUNING AREAS, OPTICAL RECORDING/REPRODUCING APPARATUS AND METHOD USING THE SAME

(75) Inventors: Min-Seok Kim, Suwon-si (KR); Jong-kyu Kim, Suwon-si (KR); Yong-jin Ahn, Seoul (KR); Kyung-pil Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 929 days.

(21) Appl. No.: 11/320,578

(22) Filed: Dec. 30, 2005

(65) Prior Publication Data

US 2006/0146672 A1 Jul. 6, 2006

(30) Foreign Application Priority Data

Jan. 3, 2005 (KR) ............... 10-2005-0000063

(51) Int. Cl.
*G11B 7/00* (2006.01)
(52) U.S. Cl. .......... 369/47.53; 369/47.5; 369/53.1; 369/275.3
(58) Field of Classification Search ............ None
See application file for complete search history.

(56) References Cited

U.S. PATENT DOCUMENTS

| 6,052,347 A * | 4/2000 | Miyata ............ 369/47.53 |
| 6,771,577 B2 * | 8/2004 | Yokoi ............... 369/59.11 |
| 7,123,563 B2 * | 10/2006 | Mimnagh et al. ......... 369/47.53 |
| 2004/0052176 A1 * | 3/2004 | Narumi et al. ........... 369/47.39 |
| 2005/0002293 A1 * | 1/2005 | Hsu et al. ................ 369/47.5 |
| 2005/0232099 A1 * | 10/2005 | Wu et al. ................ 369/44.34 |

FOREIGN PATENT DOCUMENTS

| JP | 2001-176078 | 6/2001 |
| JP | 2003-067927 | 3/2003 |
| JP | 2003-203342 | 7/2003 |
| JP | 2003-272178 | 9/2003 |
| JP | 2003-331427 | 11/2003 |

* cited by examiner

*Primary Examiner*—Peter Vincent Agustin
*Assistant Examiner*—Emily Frank
(74) *Attorney, Agent, or Firm*—Roylance, Abrams, Berdo, and Goodman, LLC (57) ABSTRACT

An optical recording/reproducing apparatus includes an optical pickup unit configured to scan an optical disk with an optical signal to record and reproduce data. A power tuning unit is configured to scan a first track with the optical signal to record a first test data to the first track, while changing a power level of the optical signal within a predetermined range in sequence. A scanning time tuning unit is configured to scan a second track with an optical signal to record a second test data to the second track, while changing a scanning time within a predetermined range in sequence. A state detection unit is configured to detect a reproduction state of the first test data and second test data. A controller is configured to check the reproductions state of the first test data and second test data and determine an optimal power level and optimal scanning time. Accordingly, a write strategy is rapidly and optically tuned.

14 Claims, 5 Drawing Sheets

OPTICAL DISK HAVING DIVIDED WRITE STRATEGY TUNING AREAS, OPTICAL RECORDING/REPRODUCING APPARATUS AND METHOD USING THE SAME

CROSS-REFERENCE TO RELATED APPLICATIONS

This application claims the benefit under 35 U.S.C. §119(a) of Korean Patent Application No. 2005-00063, filed Jan. 3, 2005 in the Korean Intellectual Property Office, the entire disclosure of which is hereby incorporated by reference.

BACKGROUND OF THE INVENTION

1. Field of the Invention

The present invention relates to an optical disk, an optical recording/reproducing apparatus and a method thereof. More particularly, the present invention relates to an optical recording/reproducing apparatus and a method for tuning a write strategy using an optical disk having divided write strategy tuning areas.

2. Description of the Related Art

As computers are widely utilized, various peripherals and components for effectively utilizing the computers, are increasingly being developed. Developments, such as various auxiliary storage media for storing saved programs or materials when a power supply is stopped, are becoming popular. General auxiliary storage media are classified as a magnetic storage medium and an optical disk storage medium. Recently, the optical disk medium has advantages over the magnetic storage medium because the optical disk medium has a high-storage capacity and high-speed searching capability.

An optical disk includes a recording medium that optically writes and reproduces data. The optical disk is classified into a compact disk-ROM (CD-ROM) and a digital versatile disk-ROM (DVD-ROM) that are read-only optical disks; a CD-Recordable (CD-R) and a DVD-R that are recordable one time only; and a CD-rewritable (DC-RW) and a DVD-RW that are repeatedly recordable.

An optical recording/reproducing apparatus scans a predetermined track of such an optical disk with optical signals, that is, laser beams, and thereby creates a land and groove on the optical disk. The optical recording/reproducing apparatus writes data of 0 or 1 to the land and groove and reproduces data by detecting a reflection light obtained by scanning the optical disk with optical signals or laser beams.

The optical disk has a different medium characteristic and thickness depending on the optical disk type. Similar type optical disks are also different from one another in characteristics depending on a manufacturer. There are about 60 types of DVD-R, 20 types of DVD-RW, and 10 types of DVD-RAM. Accordingly, if the optical recording/reproducing apparatus records data to various types of optical disk according to a fixed write strategy, incorrect data would be likely written to the optical disk. The write strategy determines how the optical disk is scanned with the optical signals. More specifically, the write strategy determines a power level and scanning time of the optical signal. The write strategy is determined based on an amplitude and duty of a driving pulse signal supplied from a laser diode for scanning with optical signals. The power level of an optical signal becomes greater as the amplitude of the driving pulse signal increases. Thus, the scanning time becomes prolonged as the duty increases.

The optical recording/reproducing apparatus uses a different write strategy depending on the types of optical disks in order to achieve a normal data recording operation. For this, a conventional optical recording/reproducing apparatus stores the write strategies suitable to various types of optical disk in a firmware. When an optical disk is placed on the optical recording/reproducing apparatus, the type of optical disk is determined. Information about the write strategy corresponding to the determined type of optical disk is read out from the firmware so that data is recorded according to the write strategy. Meanwhile, data may be recorded in a predetermined default write strategy if an optical disk does not have write strategy stored in the firmware. The default write strategy is a value that is arbitrarily set to cover various types of optical disks.

The write strategy stored in the firmware is set differently at the time of manufacture depending on the types of optical disk. Therefore, a problem exists because the write strategy shows a different function depending on the types of mass-produced optical recording apparatus. Accordingly, a selected write strategy requiring tuning within a predetermined range to be suitable to the optical recording/reproducing apparatus. The optical disk has a test area in a predetermined region to tune the write strategy. For example, the test areas include a power calibration area (PCA) in the DVD-R and DVD-RW and a drive test zone (DTZ) in the DVD-RAM.

Since the conventional optical recording/reproducing apparatus uses the test area of the optical disk to not only tune the write strategy, but to also record data, the test area is very rapidly consumed.

Meanwhile, a power calibration of an optical signal has to be performed in a non-recording area. Accordingly, if the entire test area is consumed, a clear operation is required to erase data from the test area in order to perform the power calibration of the optical signal. However, in spite of the clear operation, there still remains damage on a surface of the test area due to the previous data recording operation. Therefore, it is impossible to accurately detect an optimal power level and an optimal scanning time.

Tuning of the scanning time often requires overwriting data depending on whether a user overwrites data to a recording area. More specifically, when a user overwrites data to the optical disk, the tuning of the scanning time is not performed until data is once recoded to the test area so that the optimal scanning time is detected. Accordingly, in tuning the scanning time, the clear operation is not necessarily required although the entire test area is consumed. However, in order to perform the power calibration of the optical signal, the clear operation is necessarily required. That is, in order to tune the scanning time after the power calibration is performed by using the test area cleared, data is overwritten to the test area. Accordingly, the frequent data recording operations and clear operations may cause severe damages to the test area. As a result, the power level of the optical signal and scanning time cannot be properly compensated for. Thus, a data recording performance deteriorates.

Accordingly, there is a need for an improved optical recording/reproducing apparatus and method for rapidly and optically tuning a write strategy of an optical disk.

SUMMARY OF THE INVENTION

An aspect of embodiments of the present invention is to address at least the above problems and/or disadvantages and to provide at least the advantages described below. Accordingly, an aspect of embodiments of the present invention is to provide an optical disk having different areas for a power calibration and scanning time tuning, respectively, and an optical recording/reproducing apparatus and method of tuning a power level and scanning time by using the optical disk.

The above aspect is achieved by providing an optical recording/reproducing apparatus including an optical pickup unit configured to scan an optical disk with an optical signal to record and reproduce data. A power tuning unit is configured to scan a first track with the optical signal to record a first test data to the first track, while changing a power level of the optical signal within a predetermined range in sequence. A scanning time tuning unit is configured to scan a second track with an optical signal to record a second test data to the second track, while changing a scanning time within a predetermined range in sequence. A state detection unit is configured to detect reproduction states of the first test data and second test data. A controller is configured to check the reproduction states of the first test data and second test data and determine an optimal power level and an optimal scanning time.

Preferably, but not necessarily, the controller determines the optimal power level when the reproduced first data has a minimum value in at least one of a bit error rate (BER), jitter amount or frequency of land pre-pit (LPP) detection error occurrences.

Preferably, but not necessarily, the controller determines the optimal scanning time when the reproduced second test data has a minimum value in at least one of a BER, jitter amount or frequency of LPP detection error occurrences.

Preferably, but not necessarily, the first track and second track each has a plurality of sections.

Preferably, but not necessarily, if all sections of the first track are used for data recording, the controller controls the power tuning unit to clear the first track and scan the first track with the optical signal whose power level is tuned.

Preferably, but not necessarily, the controller detects a first section among the plurality of sections of the second track that has a same usage frequency as the optical disk, and controls the scanning time tuning unit to scan the first section with the optical signal whose scanning time is tuned.

Preferably, but not necessarily, if the first section is not detected, the controller selects a predetermined second section among the plurality of sections of the second track and overwrites data to the second section with a same usage frequency as the optical disk, and then controls the scanning time tuning unit to scan the second section with the optical signal whose scanning time is tuned.

The above aspect is also achieved by providing a write strategy tuning method of an optical recording/reproducing apparatus which scans an optical disk with an optical signal to record and reproduce data. The method includes a first track scanned to record a predetermined first test data to the first track, while changing a power level of the optical signal within a predetermined range in sequence. A second track is scanned to record a predetermined second test data to the second track, while changing a scanning beam of the optical signal in a predetermined range in sequence. The first test data and second test data are reproduced. A reproduction state of the first test data is checked and an optimal power level of the optical signal is determined. A reproduction state of the second test data is checked and an optimal scanning time of the optical signal is determined.

Preferably, but not necessarily, the optimal power level is determined when the reproduced first test data has a minimum value in at least one of a bit error rate (BER), jitter amount or frequency of land pre-pit (LPP) detection error occurrences.

Preferably, but not necessarily, the optimal scanning time is determined when the reproduced second test data has a minimum value in at least one of a BER, jitter amount or frequency of LPP detection error occurrences.

Preferably, but not necessarily, a first track is scanned, which includes a non-recording section detected from the first track and the detected section is scanned with the optical signal whose power level is tuned, and if all sections of the first track are used for data recording, the first track is cleared.

Preferably, but not necessarily, a second track scanned, which includes a section detected among the sections of the second track that is used with a same usage frequency as the optical disk, the detected section is scanned with the optical signal whose scanning time is tuned, and if the section having the same usage frequency is not detected, a predetermined section is selected among the sections of the second track and data is overwritten to the optical disk with the same usage frequency as the optical disk, and then the second track section is scanned with the optical signal whose tuning time is tuned.

Other objects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
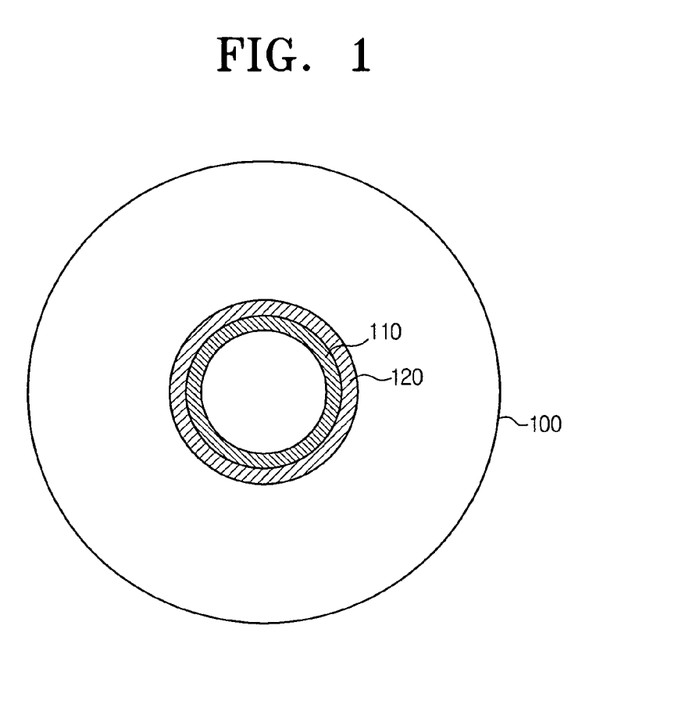
FIG. 1 is a view illustrating an optical disk according to an exemplary embodiment of the present invention.

FIG. 1 is a view illustrating an optical disk according to an exemplary embodiment of the present invention. An optical disk 100 is fabricated in a circular shape and consists of a plurality of tracks forming concentric circles with reference to a central axis. According to an exemplary embodiment of the present invention, the optical disk 100 is provided with an area for an optical recording/reproducing apparatus to tune a write strategy. The write strategy is preferably a suitable optical signal power level and optical signal scanning time for the recording of data to the optical disk 100. For example, the optical disk 100 comprises a first track 110 to tune the optical signal power level and a second track 120 to tune the optical signal scanning time.

The first track 110 writes a first test data using an optical signal scanned by the optical recording/reproducing apparatus while changing a power level of the optical signal in sequence. Accordingly, the optical recording/reproducing apparatus detects an optimal optical signal power level by reading the first test data and checking a reproduction state of the first test data. More detailed descriptions will be made below.

The second track 120 writes a second test data using an optical signal scanned by the optical recording/reproducing apparatus while changing a scanning time of the optical signal in sequence. Accordingly, the optical recording/reproducing apparatus detects an optimal optical signal scanning time by reading the second test data and checking a reproduction state of the second test data. Further detailed descriptions will be made below.

Figure 2:
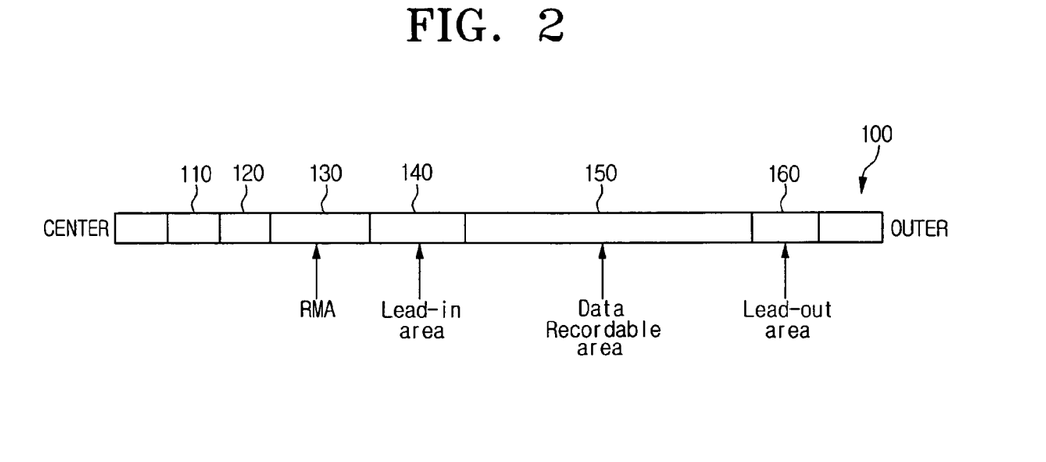
FIG. 2 is a cross-section view of FIG. 1.

FIG. 2 is a cross-section view of FIG. 1. Referring to FIG. 2, the optical disk 100 comprises the first track 110, the second track 120, a recording management area 130, a lead-in area 140, a data recordable area 150, and a lead-out area 160 in a sequential order from the center.

The first track 110 and the second track 120 are test areas for detecting an optimal write strategy of an optical signal, that is, the optimal optical signal power level and optimal optical signal scanning time. The first and second tracks 110, 120, respectively, are divided into a plurality of sections. The recording management area 130 writes thereto information about the write strategy set by a manufacturer of the optical disk 100 and addresses the first and second tracks 110, 120, respectively. The optical recording/reproducing apparatus determines a range for tuning the optical signal power level and scanning time, and perceives locations of the first and second tracks 110, 120, respectively, based on the data reproduced from the recording management area 130.

The lead-in area 140 writes information about a capacity and creator of the optical disk 100, number of recorded tracks, start position, and length of each track. Actual data is written to the data recordable area 150 by a user. The lead-out area 160 informs the user that the data recording is completed.

The optical recording/reproducing apparatus determines the optimal optical signal power level and optimal optical signal scanning time by using the first and second tracks 110, 120, respectively, and then scans the data recordable area 150 with the optical signal according to the determined power level and scanning time. As a result, data is recorded to the optical disk 100.

Figure 3:
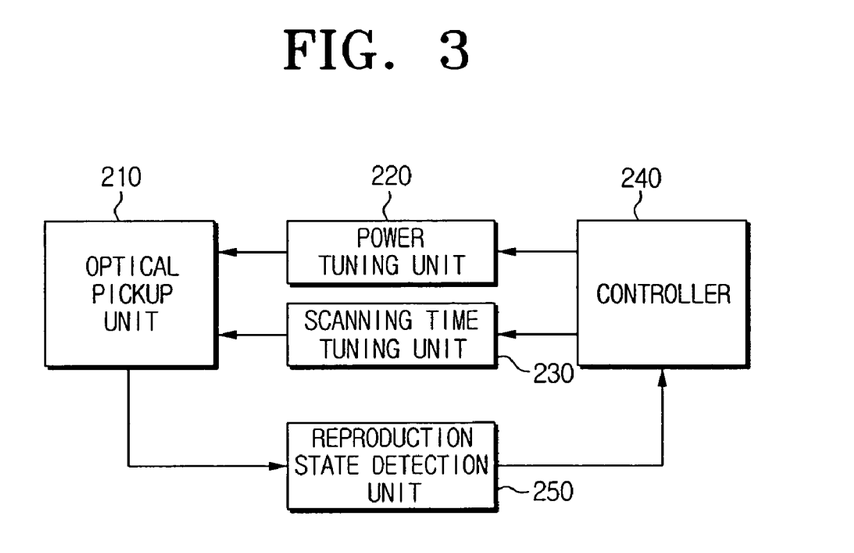
FIG. 3 is a block diagram illustrating an optical recording/reproducing apparatus according to an exemplary embodiment of the present invention.

FIG. 3 is a block diagram illustrating an optical recording/reproducing apparatus according to an exemplary embodiment of the present invention. Referring to FIG. 3, the optical recording/reproducing apparatus comprises an optical pickup unit 210, a power tuning unit 220, a scanning time tuning unit 230, a controller 240 and a reproduction state detection unit 250. The optical disk 100, illustrated in FIGS. 1 and 2, is placed on the optical recording/reproducing apparatus.

The optical pickup unit 210 scans the optical disk 100 surface with the optical signal, thereby recording or reproducing data. The surface of the optical disk 100 is divided into a groove track and land track. Pits are formed in the groove track, and the land track is formed between the groove tracks to prevent crosstalk from occurring between neighboring groove tracks. The optical pickup unit 210 scans the groove track with the optical signals, thereby forming the pits and recording data of 0 or 1. Also, the optical pickup unit 210 scans the grove track with the optical signal, thereby reproducing high-frequency signals corresponding to the pits.

The power tuning unit 220 and the scanning time tuning unit 230 tune the write strategy of the optical disk 100. The power tuning unit 220 controls the optical pickup unit 210 to scan the first track 110 in order to record a predetermined first test data, while changing a power level of the optical signal in sequence within a predetermined range. That is, the power tuning unit 220 changes a magnitude of a driving pulse signal supplied from a light source disposed in the optical pickup unit 210 within a predetermined range, thereby tuning the power level of the optical signal scanned by the light source. The tuning range may be set according to a predetermined write strategy. The write strategy is provided from various sources. For example, the write strategy uses write strategy information reproduced from the recording management area 130 of the optical disk 100, or uses information set differently for each type of media by a manufacturer of the optical recording/reproducing apparatus and stored in a firmware.

The scanning time tuning unit 230 controls the optical pickup unit 210 to scan the second track 120 in order to record a predetermined second test data, while changing a scanning time of the optical signal in sequence within a predetermined range. The optical signal scanning time is tuned in accordance with a change in duty of the driving pulse signal. The scanning time tuning range is set according to the write strategy as described above.

The controller 240 controls the optical pickup unit 210 to reproduce the first test data and second test data recorded, using the optical signal which is tuned by the power tuning unit 220 and scanning time tuning unit 230.

Depending on the first and second test data being reproduced, the reproduction state detection unit 250 determines the reproduction state of the first and second test data. The reproduction state is preferably represented by an error status index indicating a reproduction error of the data. The error status index includes a bit error rate (BER), jitter amount, or frequency of land pre-pit (LPP) detection error occurrences. The BER indicates a correlation between data before recording and a data after reproduction. A minimum BER means that the correlation between the data before recording and the data after reproduction is high. The jitter is preferably a phenomenon that shakes or oscillates a pulse of data signal reproduced from the optical disk 100 and thus causes the pulse to deviate. If data is written according to a clock to data (C/D) scheme, the reproduction state detection unit 250 can calculate jitter by determining whether a recording mark of a clock signal conforms to a recording mark of a data signal. The LPP is preferably a pit that is formed along the land track of the optical disk 100 in order for the optical recording/reproducing apparatus to perceive a track address. If the frequency of LPP detection error occurrences exceeds a predetermined value, the reproduction state is determined to be abnormal.

The controller 240 checks the error status index detected by the reproduction state detection unit 250 with respect to the first and second test data. When the error status index reaches a minimum value, an optimal power level and optimal scanning time for the optical signal are determined. Accordingly, the controller 240 tunes the write strategy to have the determined optimal power level and optimal scanning time, and data is written according to the write strategy. Operations of recording data while tuning the power level and scanning time, and then detecting an optimal power level and optimal scanning time by reproducing the data are preferably called 'power calibration' and 'scanning time tuning,' respectively.

As described above, the first and the second tracks 110, 120, respectively, are divided into a plurality of sections. The controller 240 utilizes different sections depending on characteristics of the power calibration and scanning time tuning.

For example, in order to perform the power calibration, the controller 240 detects a non-recording area from the first track 110. The controller 240 then determines whether a non-recording area exists in the first track 110 by reproducing data from the recording management area 130. If there is not a non-recording area, the controller 240 erases data from the first track 110 of the optical disk 100 and then performs the power calibration.

In order to perform the scanning time tuning, the controller 240 checks a previously used test section by reproducing data from the recording management area 130 and then determines a new test section. In an exemplary embodiment of the present invention, the new test section is preferably determined based on a frequency of overwritings of data to the data recordable area 150, that is, usage frequency of the optical disk 100. For example, if the optical disk 100 has a one time recording operation, a section having the one time recording operation is selected from the second track because the scanning time is accurately tuned only if the test section has the same condition as the data recordable area 150. Accordingly, it is preferable to detect the section having the same condition as the data recordable area 150 based on the usage frequency of the data recordable area 150, and then tune the scanning time by using the detected section.

If there is not a section having the same usage frequency as the data recordable area 150, a certain section is selected and data is overwritten to the certain section such that the certain section has the same usage frequency. In an exemplary embodiment of the present invention, the selected section preferably has similar frequency to that of the data recordable area 150. For example, if the optical disk 100 has been used three times and there is a section that has been used two times, the scanning time is tuned after the section is determined and data is written to the determined section once more.

Figure 4:
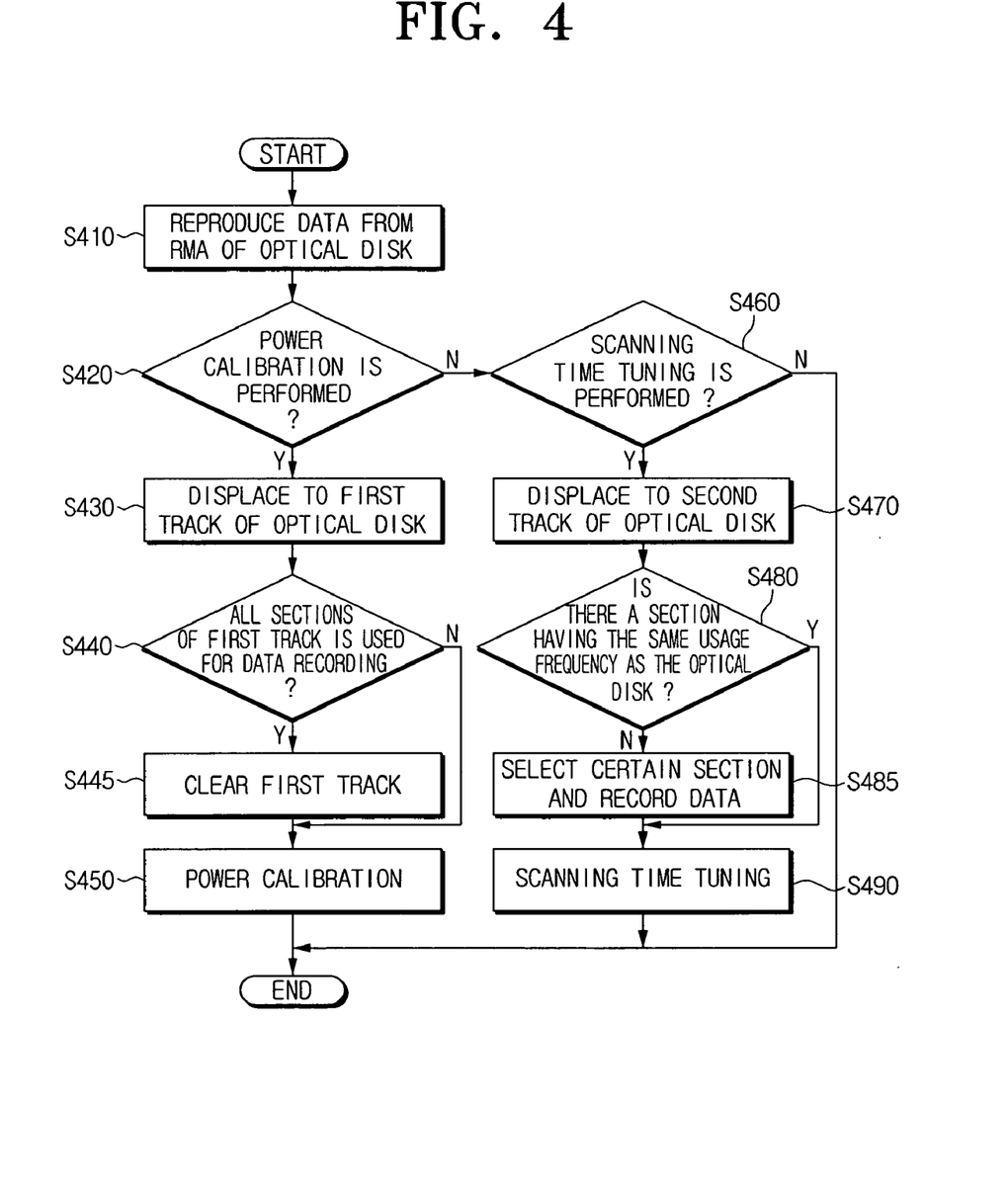
FIG. 4 is a flowchart illustrating a method of tuning a write strategy of an optical recording/reproducing apparatus according to an exemplary embodiment of the present invention.

FIG. 4 is a flowchart illustrating a method for tuning a write strategy according to an exemplary embodiment of the present invention. Referring to FIG. 4, when the optical disk 100 is placed on the optical recording/reproducing apparatus, the optical pickup unit 210 scans the recording management area 130 of the optical disk 100 with an optical signal, thereby reproducing data at operation S410. The data reproduced from the recording management area 130 includes write strategy information, address information about the first and second tracks 110, 120, respectively, and usage frequency information.

If a power calibration is determined to be completed at operation S420, the controller 240 displaces the optical pickup unit 210 to the first track 110 at operation S430.

The controller 240 determines that the entire sections of the first track 110 have been used for the recording operation based on the data reproduced from the recording management area 130 at operation S440.

If a non-recording section exists in the first track 110, the optical pickup unit 210 is displaced to the non-recording section and then performs the power calibration at operation S450.

If the non-recording section does not exist in the first track 110, the first track 110 is cleared at operation S445. Accordingly, the optical pickup unit 210 is displaced to the initial section of the first track 110 and then performs the power calibration at operation S450.

If the scanning time tuning is determined to be completed at operation S460, the controller 240 displaces the optical pickup unit 210 to the second track 120.

A section is selected among the plurality of sections of the second track 120 for the scanning time tuning operation at operation S480. That is, whether a section having the same usage frequency as the data recordable area 150 is determined. If the section having the same usage frequency is detected, the optical signal scanning time tuning operation is performed using the section at operation S490.

On the other hand, if there is not a section having the same usage frequency, a certain section is selected and data is written until the certain section has the same usage frequency as the data recordable area 150 at operation S485. Next, the optical signal scanning time tuning operation is performed by using the section at operation S490. In an exemplary embodiment of the present invention, a section having a similar usage frequency to the data recordable area 150 is preferably selected.

Figure 5:
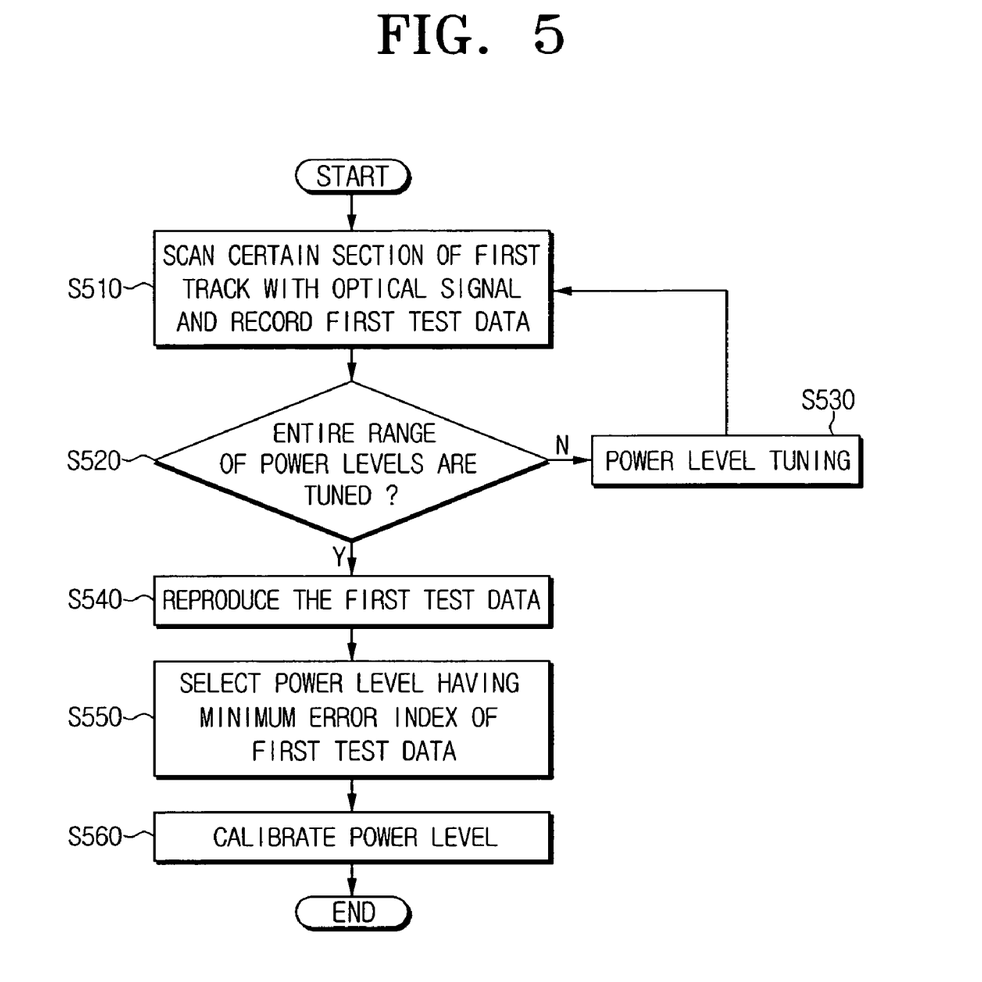
FIG. 5 is a flowchart illustrating a method for power calibration according to an exemplary embodiment of the present invention.

FIG. 5 is a flowchart illustrating the power calibration in detail. Referring to FIG. 5, the optical recording/reproducing apparatus scans the selected section of the first track with optical signals, thereby recording the first test data at operation S510. The optical signal power level is set to a minimum value or maximum value of a range set for the write strategy.

The optical recording/reproducing apparatus tunes the entire range of power levels in sequence and records the first test data at operations S520 and S530.

If the tuning of the entire range of power levels is completed, the first test data is reproduced from the first track 110 at operation S540.

An optimal power level is determined when the error status index indicating the reproduction state of the first test data has a minimum value at operation S550. The error status index includes a bits error rate (BER), jitter amount, and frequency of land pre-pit (LPP) detection error occurrences. Accordingly, the optical signal power level is calibrated so that the optical signal power level can have an optimal value at operation S560.

Figure 6:
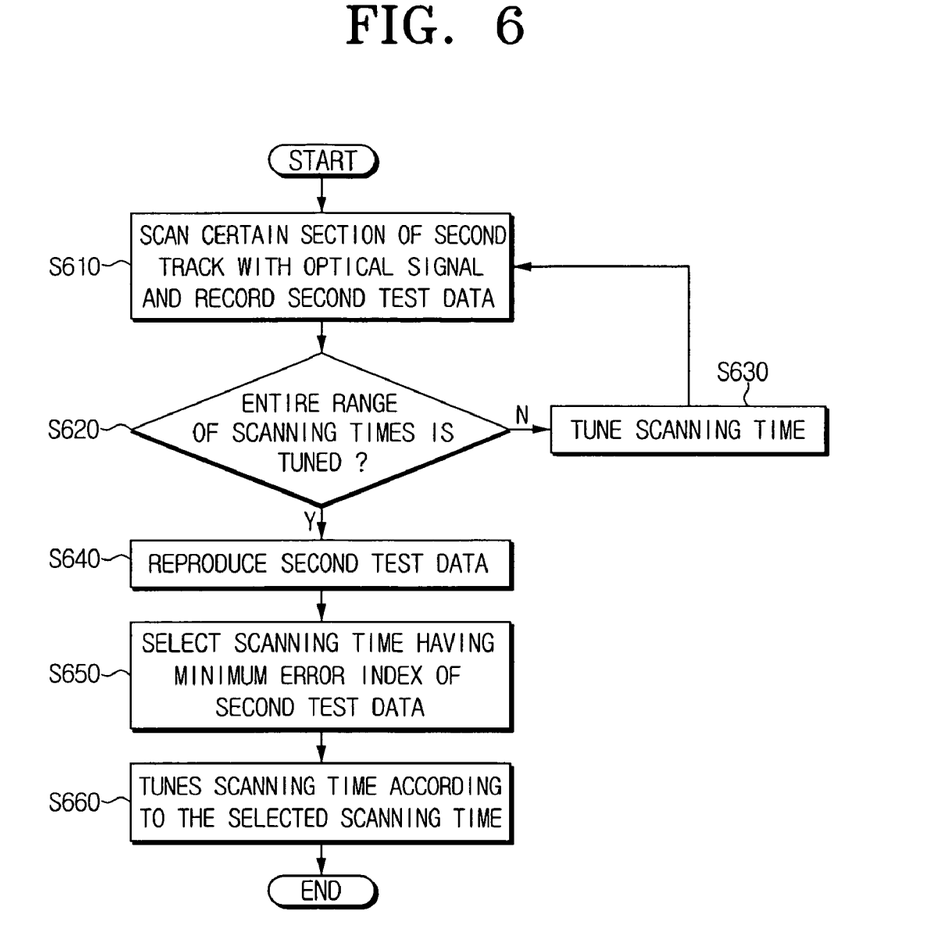
FIG. 6 is a flowchart illustrating a method for tuning an optical signal scanning time according to an exemplary embodiment of the present invention.

FIG. 6 is a flowchart illustrating a method for tuning an optical signal scanning time according to an exemplary embodiment of the present invention. Referring to FIG. 6, the optical recording/reproducing apparatus scans a selected section of the second track 120, thereby recording the second test data at operation S610. The optical signal scanning time is set to either a minimum value or maximum value of a set range of scanning times.

The optical recording/reproducing apparatus tunes the entire range of scanning times in sequence and records the second test data at operation S620 and S630.

If the entire range of scanning times is tuned at operation S620, the second test data is reproduced at operation S640. A scanning time having a minimum error status index of the second test data is determined to be an optimal scanning time at operation S650. The scanning time of the optical signals is tuned according to the optimal scanning time at operation S660. Since the scanning time tuning operation is performed at a different area from the optical signal power calibration, the scanning time tuning operation is not interfered by the optical signal power calibration.

As described above, the optical disk 100 has different areas for the optical signal power calibration and the scanning time tuning operation, which correspond to the write strategy. Accordingly, since the optical disk 100 may be used for optical power calibration and scanning time tuning, the optimal power level and optimal scanning time may be accurately detected. Thus a recording performance of the optical recording/reproducing apparatus may be improved.

While the invention has been shown and described with reference to certain exemplary embodiments thereof, it will be understood by those skilled in the art that various changes in the form and details may be made therein without departing from the spirit and scope of the invention as defined by the appended claims.

What is claimed is:

1. An optical recording/reproducing apparatus comprising:
   an optical pickup unit configured to scan an optical disk with an optical signal to record and reproduce data, the optical disk including a data recording area, a power level area, and a scanning time area separately located from the power level area;
   a power tuning unit configured to scan a first track on the power level area with the optical signal to record a first test data that determines an optical signal power level to the first track, while changing a power level of the optical signal within a predetermined range in sequence;
   a scanning time tuning unit configured to scan a second track being different than the first track on the scanning area with an optical signal to record a second test data that determines an optical signal scanning time to the second track, while changing a scanning time within a predetermined range in sequence;
   a state detection unit configured to detect reproduction states of the first test data and second test data; and
   a controller configured to check the reproduction states of the first test data and the second test data and determine an optimal power level and optimal scanning time,
   wherein the scanned first track is located on a different area of the optical disk than the scanned second track.

2. The optical recording/reproducing apparatus as claimed in claim 1, wherein the controller determines the optimal power level when a reproduced first data has a minimum value in at least one of a bit error rate (BER), jitter amount or frequency of land pre-pit (LPP) detection error occurrences.

3. The optical recording/reproducing apparatus as claimed in claim 1, wherein the controller determines the optimal scanning time when a reproduced second test data has a minimum value in at least one of a BER, jitter amount or frequency of LPP detection error occurrences.

4. The optical recording/reproducing apparatus as claimed in claim 1, wherein the first track and second track each has a plurality of sections.

5. The optical recording/reproducing apparatus as claimed in claim 4, wherein, if all sections of the first track are used for data recording, the controller controls the power tuning unit to clear the first track and scan the first track with the optical signal whose power level is tuned.

6. The optical recording/reproducing apparatus as claimed in claim 4, wherein the controller detects a first section among the plurality of sections of the second track that has a same usage frequency as the optical disk, and controls the scanning time tuning unit to scan the first section with the optical signal whose scanning time is tuned.

7. The optical recording/reproducing apparatus as claimed in claim 6, wherein, if the first section is not detected, the controller selects a predetermined second section among the plurality of sections of the second track and overwrites data to the second section with a same usage frequency as the optical disk, and then controls the scanning time tuning unit to scan the second section with the optical signal whose scanning time is tuned.

8. An optical disk comprising:
   a data recording area, a power level area, and a scanning time area separately located from the power level area;
   a first track scanned on the power level area by an optical recording/reproducing apparatus to record a predetermined first test data that determines an optical signal power level to the first track, while changing a power level of the optical signal in a predetermined range in sequence; and
   a second track scanned on the scanning time area by the optical recording/reproducing apparatus to record a predetermined second test data that determines an optical signal scanning time to the second track, while changing a scanning time of the optical signal within a predetermined range in sequence,
   wherein the scanned first track is located on a different area of the optical disk than the scanned second track.

9. The optical disk as claimed in claim 8, wherein the first track and second track each has a plurality of sections.

10. A write strategy tuning method of an optical recording/reproducing apparatus which scans an optical disk with an optical signal to record and reproduce data the optical disk including a data recording, a power level area, and a scanning time area separately located from the power level area, the method comprising the steps of:
    scanning a first track on the power level area to record a predetermined first test data that determines an optical signal power level to the first track, while changing a power level of the optical signal within a predetermined range in sequence;
    scanning a second track being different than the first track on the scanning time area to record a predetermined second test data that determines an optical signal scanning time to the second track, while changing a scanning time of the optical signal in a predetermined range in sequence;
    reproducing the first test data and second test data;
    checking a reproduction state of the first test data and determining an optimal power level of the optical signal; and
    checking a reproduction state of the second test data and determining an optimal scanning time of the optical signal,
    wherein the scanned first track is located on a different area of the optical disk than the scanned second track.

11. The method as claimed in claim 10, wherein the step of determining an optimal power level is determined when the reproduced first test data has a minimum value in at least one of a bit error rate (BER), jitter amount or frequency of land pre-pit (LPP) detection error occurrences.

12. The method as claimed in claim 10, wherein the step of determining an optimal scanning time is determined when the reproduced second test data has a minimum value in at least one of a BER, jitter amount or frequency of LPP detection error occurrences.

13. The method as claimed in claim 10, wherein the step of scanning a first track comprises:

detecting a non-recording section from the first track and scanning the detected section with the optical signal whose power level is tuned; and clearing the first track if all sections of the first track are used for data recording.

14. The method as claimed in claim 10, wherein the step of scanning a second track comprises:

detecting a section among sections of the second track that is used with a same usage frequency as the optical disk;

scanning the detected section with the optical signal whose scanning time is tuned; and selecting a predetermined section among the sections of the second track if the section having the same usage frequency is not detected, and overwriting data to the optical disk with the same usage frequency as the optical disk, and then scanning the second track section with the optical signal whose tuning time is tuned.

* * * * *